United States Patent [19]

Schächter

[11] E Patent Number: Re. 33,282

[45] Reissued Date of Patent: Jul. 31, 1990

[54] LIQUID GAS-OPERATED LIGHTER

[75] Inventor: Friedrich Schächter, Vienna, Austria

[73] Assignee: BIC Corporation, Milford, Conn.

[21] Appl. No.: 136,594

[22] PCT Filed: Nov. 23, 1981

[86] PCT No.: PCT/AT81/00028

§ 371 Date: Jul. 23, 1982

§ 102(e) Date: Jul. 23, 1982

[87] PCT Pub. No.: WO82/01932

PCT Pub. Date: Jun. 10, 1982

Related U.S. Patent Documents

Reissue of:

[64] Patent No.: 4,560,345
Issued: Dec. 24, 1985
Appl. No.: 403,499
Filed: Nov. 23, 1981

[30] Foreign Application Priority Data

Nov. 24, 1980 [AT] Austria ..... 5726/80

[51] Int. Cl.[5] ..... F23D 13/04
[52] U.S. Cl. ..... 431/344
[58] Field of Search ..... 431/131, 344; 222/3; 251/120, 121

[56] References Cited

U.S. PATENT DOCUMENTS

| | | | |
|---|---|---|---|
| 3,695,819 | 10/1972 | Tricot | 431/344 |
| 3,761,221 | 9/1973 | Stillions . | |
| 3,766,946 | 10/1973 | Corarg . | |
| 3,854,862 | 12/1974 | Webster | 431/344 X |
| 3,895,905 | 7/1975 | Nissen | 431/254 |
| 3,963,413 | 6/1976 | Lockwood et al. | 431/276 |
| 4,101,262 | 7/1978 | Neyret | 431/344 |
| 4,332,549 | 6/1982 | Fuller | 431/344 |

FOREIGN PATENT DOCUMENTS

| | | | |
|---|---|---|---|
| 1457631 | 10/1969 | Fed. Rep. of Germany | 431/344 |
| 2622096 | 12/1976 | Fed. Rep. of Germany | 431/344 |
| 2313638 | 6/1975 | France | 431/344 |
| 2303239 | 10/1976 | France | 431/344 |
| 2444891 | 8/1980 | France | 431/344 |

*Primary Examiner*—Randall L. Green
*Attorney, Agent, or Firm*—Pennie & Edmonds

[57] ABSTRACT

Liquid gas-operated lighter, particularly pocket lighter, comprising a burner tip, a fuel tank, and, arranged therebetween, a non-adjustable control device for the flame height. The control device is provided with a fuel-permeable proportioning disk of microporous film which, on the side facing the fuel tank, is tightly braced in its border region by means of a bracing disk having a passage for the fuel, and, on the side facing the burner tip, rests against a component having a gas-permeable layer, the bracing disk (15) forming the conclusion of the lower end of the control device (12, 13, 14, 15, 16). In the vertical position of use of the lighter, this end is always located at a distance above the liquid phase of the liquid gas. The space between the control device and the liquid level (21) is free from structural components.

42 Claims, 3 Drawing Sheets

LIQUID GAS-OPERATED LIGHTER

Matter enclosed in heavy brackets [ ] appears in the original patent but forms no part of this reissue specification; matter printed in italics indicates the additions made by reissue.

BACKGROUND OF THE INVENTION

The invention relates to a liquid gas-operated lighter, particularly pocket lighter, comprising a burner tip, a fuel tank and, arranged therebetween, a non-adjustable control device for the flame height which is provided with a fuel-permeable proportioning disk of microporous film. On its side facing the fuel tank, the proportioning disk is tightly braced in its border region by means of a bracing disk which is provided with a passage for the fuel and, on its side facing the burner tip, the proportioning disk rests against a structural component having a gas-permeable layer.

In pocket lighters, particularly in those having no adjustable flame regulator, manufacturing inconsistencies lead to a great problem with respect to keeping the flame height constant, particularly with respect to achieving a uniform burning of the flame. Moreover, due to the fact that the vapor pressure of the fuel depends upon the temperature, the amount of gas discharged and, therefore, the flame height change as the temperature changes. For example, assuming a normal flame with a height of 25 mm at 25° C., a temperature change of about 10° C. results in a change of the flame height of about 10 mm, about 1 milligram fuel per second being consumed at a flame height of 25 mm when using, for example, isobutane gas. When the temperature influences are compounded with the manufacturing inconsistencies, unexpectedly high flames may frequently occur, which represent a safety risk.

In lighters having a wick or an ascending pipe, and in lighters in which the fuel tank contains air whose pressure is higher than the vapor pressure of the liquid gas, a decrease of the liquid level with increasing consumption also leads to a change of the flame height. Experience has shown that in known lighters even the aging in the unused state leads to a change of the originally adjusted flame characteristic. This is particularly true when the lighters are subjected to changing or extreme ambient conditions.

Also, a flickering of the flames can be frequently observed. This is particularly true for pocket lighters which are subjected to very different temperatures, on the one hand, and which are frequently in a completely undefined carrying position immediately prior to being used.

In these devices, the relative constancy of the flame height is also primarily a safety problem because unexpectedly high flames may lead to burns or to the unintentional igniting of objects. Because of the importance of this problem, even non-refillable lighters, or so-called disposable lighters, practically without exception have adjustable flame regulators, which substantially increases their manufacturing costs. Nevertheless, the problem of exceeding the permissible maximum flame height is not satisfactorily solved in this manner. Therefore, several countries are considering introducing legal limitations for such products.

A vast majority of the conventional gas lighters are provided with porous bodies serving as flow-control elements for the fuel. These flow-control elements are simultaneously used for regulating the flame height. Inasmuch as they are bodies made of fibers, the amount of fuel passing therethrough can be regulated by an appropriate compression of the body; the stronger the body is compressed, the lower becomes the amount flowing through. If the flow-control bodies consist of rigid, porous materials, such as, sintered material, the amount flowing through is regulated by covering the surface of the portions of the body exposed to the fuel by elastically deformable elements. However, it is also known to conduct the fuel through a narrow bore of a rubber-elastic element toward the burner tip and to regulate the amount flowing through by radially deforming the rubber body by applying an axial pressure, thereby reducing the diameter of the small bore serving as passage.

In these cases, the compression is adjusted during the manufacture of the lighters in such a way that the flame has a permissible height. It is left to the user to adjust a flame height deviating therefrom.

It may happen in pocket lighters that a dangerously high flame occurs at the time of ignition or during the adjustment of the flame height, which causes small droplets of liquid gas to be entrained by its gas phase, resulting in flickering of the flame. Therefore, it is desirable to limit the amount of fuel discharged. It is known that such a limitation can be achieved by a certain microporous plastics film. Such a film can be provided either instead of a flame regulating mechanism or in addition thereto, as shown by French Pat. Nos. 2,313,638 and 2,313,639. In these lighters, the porous film separates a wetting chamber from a vaporization chamber. In these lighers, it must be ensured that liquid fuel wets the membrane on the side of the film exposed to the fuel, for which purpose wicks or dip pipes are provided. As a result, the manufacture of these lighers becomes more complicated and more expensive.

It is the object of the invention to provide a simple structural design of lighters, which leads to a low reject rate in the mass production of such pocket lighters (disposable lighters). By decreasing the number of structural components, the manufacturing costs are reduced.

The invention resides in the finding, contrary to the prevailing view, that a uniform flame whose height is limited can be achieved even during long burning durations, when fuel is present in the gaseous state on the side of the membrane exposed to the fuel. However, the practical embodiment poses difficulties because the uncontrolled position of the lighter between uses always causes liquid fuel to reach the membrane and to wet the latter. Therefore, it must be ensured that the liquid fuel quickly runs off from the membrane into the tank when the lighter is positioned vertically into its position of use and that only a non-avoidable amount of liquid fuel remains in the region of the membrane. Therefore, the basic concept of the invention resides in constructing the size and shape of the structural components of the control device facing the interior of the fuel tank in such a way that as little as possible liquid fuel is retained by surface forces.

In the above-described pocket lighters having a control device, the latter has a bracing disk which tightly presses together in its border region the proportioning disk which also consists of microporous film, so that only the surface area free from compression action is available for the passage of the fuel. Such a control device meets the requirements for achieving the object of the invention if, in accordance with the invention, the bracing disk forms the conclusion of the lower end of the control device, and when, in the vertical position of use of the lighter, this end is always situated at a distance above the liquid phase of the liquid gas and the space between the control device and the level of the liquid is free from structural components.

Surprisingly, the construction of the control device in accordance with the invention results in a very uniformly burning flame and, furthermore, the lighters leaving the manufacturing plant have insignificant inconsistencies with respect to the flame height. Since the lighters have no regulating mechanism for adjusting the flame height, it is particularly important that the flame height resulting from the manufacture of the lighters is as uniform as possible and corresponds to the normal flame height of 25 mm at 298° K.

An advantageous embodiment results when the surfaces and spaces of the control device and its housing facing the fuel tank and facilitating the adherence of the liquid fuel have such a size and volume that the amount of liquid fuel which adheres to these structural components due to surface forces when the lighter is moved into the normal, vertical position of use, is smaller than the amount of fuel consumed by the normal flame within three seconds, preferably within less than one second.

For improving the desired effects, the surfaces, particularly those of the bracing disk, can be provided with a coating which repels the liquid fuel.

The invention further relates to the structural design and the selection of material for the proportioning disk, bracing disk and the structural component having a gas-permeable layer. In the following, several embodiments of the invention shall be described with the aid of the drawing, without limiting the invention to these embodiments.

DETAILED DESCRIPTION OF THE INVENTION

Figure 1:
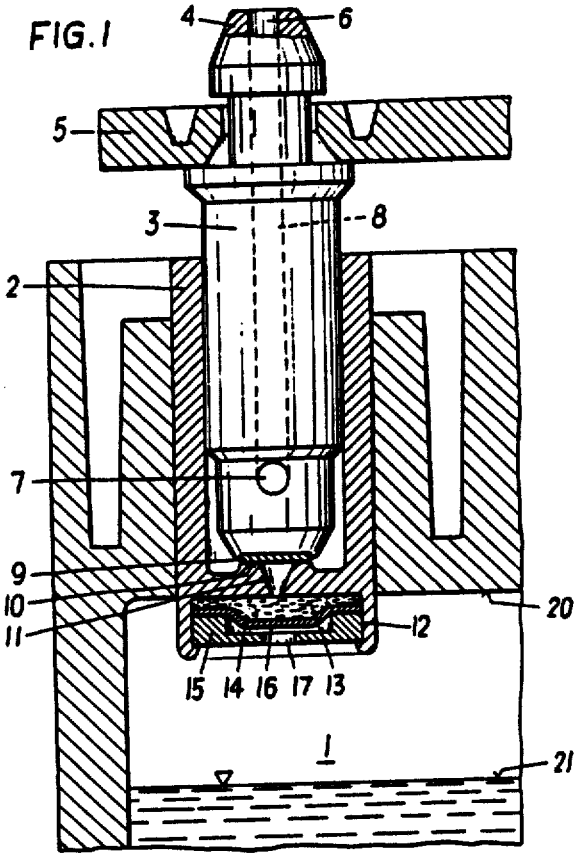
FIG. 1 is a partial sectional view of a lighter in accordance with the invention which is equipped with a non-adjustable control device for keeping the flame height constant. For clarity's sake, all those parts which are not necessary for the explanation of the invention are not illustrated.

In accordance with FIG. 1, a valve member 2 is pressed in a gas-tight manner into the upper wall of a liquid-gas tank 1. In a bore on the side facing away from the tank, the valve member 2 receives a displaceable burner pipe 3. At its upper end, the burner pipe 3 has a burner tip 4 underneath which an actuating lever 5 engages. A bore 8 within the burner pipe 3 extends from an outlet 6 to a transverse bore 7. At the lower end of the burner pipe 3, a sealing disk 9 is arranged which interacts with a valve seat 10 of the valve member 2. When the lighter is not used, the actuating lever 5 presses the burner pipe 3 toward the bottom against the valve seat 10 with the aid of a spring, not shown, and thereby closes a valve bore 11.

At its side facing the tank 1, the valve member 2 has an annular flange forming recess 12 against whose end face is placed a non-woven fiber material layer 13 which forms the component having the gas-permeable layer. Underneath the non-woven fiber material layer 13 is arranged a proportioning disk 14 which is pressed against the non-woven fiber material layer by a bracing disk 15, so that the bracing surface is substantially closed in a gas-tight manner. A hollow space 16 is arranged in the bracing disk 15. The hollow space 16 is connected to the tank 1 via an opening 17.

The recess 12, the non-woven fiber material layer 13, the proportioning disk 14, the bracing disk 15 and the hollow space 16 form the control device in accordance with the invention.

The proportioning disk 14 is composed of a microporous plastics film which is permeable in the direction of the surface normal for the liquid and the gaseous phases of the liquid gas. Particularly suitable is a microporous, uniaxially stretched polypropylene film having a thickness of between 10 and 100 μm, preferably between 15 and 39 μm, and having slot-like pores oriented in the stretching direction. Such a product is sold at the present time, inter alia, by Celanese Corp., U.S.A., under the tradename "Celgard ®2500". Preferably, the thermal expansion coefficient of the proportioning disk 14 is close or equal to that of the bracing disk 15.

The non-woven fiber layer 13 has a thickness of 20 to 200 μm, preferably 20 to 50 μm. Particularly suitable for this purpose are textile laminated materials of non-woven polypropylene fibers, manufactured either according to the melt-air-blow method or the spinbond method. Particularly the melt-air-blow method provides very uniform laminated materials. A particular advantage of the non-woven fiber material layer 13 resides in the alleviation of mechanical instabilities of the proportioning disk 14, such as, periodic fluttering.

The proportioning disk 14 and the non-woven fiber material layer 13 are braced into the recess 12 by means of the bracing disk 15 in such a way that the bracing surface forms a gas-tight closure. The bracing disk 15 is fixed by flanging the rim of the recess 12. It is advantageous to make the valve member 2 of a metal material, preferably of machining brass, because the high compressive strength of such materials facilitates a reliably tight closure.

In accordance with FIG. 1, the hollow space 16 in the bracing disk 15 is provided in its side facing the proportioning disk 14. However, it can also be formed in a different manner and it can also be located on the side of the proportioning disk 14 facing away from the tank 1. The cross-sectional area of the hollow space 16 perpendicularly to the axis of the proportioning disk 14 determines the size, position and shape of the surface of the proportioning disk 14 exposed to the fuel. Generally, this surface will be circular. However, it can also have another shape. In the latter case, the diameter of a circular area of equal size is designated the hydraulic diameter of the surface deviating from the circular shape. The thickness of the bracing disk 15 is smaller than the hydraulic diameter, preferably smaller than half the hydraulic diameter.

It is the purpose of the hollow space 16 to keep a defined cross-sectional area of the proportioning disk 14 free for the passage of gas. The surface area of the proportioning disk 14 exposed to the fuel is coordinated to its gas permeability in such a way that a desired amount of gas is allowed to pass through in the direction of the burner tip. The depth of the hollow space must be at least of such a magnitude that the bracing force imparted by the bracing disk 15 to the proportioning disk 14 and the non-woven fiber material layer 13 does not impair the gas permeability of the non-woven fiber material layer 13 parallel to the contact surface. When the proportioning disk 14 has a thickness of 15 to 50 μm and the non-woven fiber material layer 13 has a thickness of 20 to 50 μm, a depth of the hollow space 16, of, for example, 0.1 to 0.14 mm is sufficient. Due to its small thickness, the proportioning disk 14 is extremely flexible, so that it yields into an open space as a result of even a low pressure, as it can be transmitted, for example, by the non-woven fabric material layer 13 without significant compression or as it prevails, for example, as the saturated vaporization pressure in the tank 1. By the bracing force exerted by the bracing disk 15, the non-woven fiber material layer 13 is compressed in the region of the bracing surface and the proportioning disk 14 is pressed into it, so that the bracing area becomes gas-impermeable. In the region of the hollow space 16, the non-woven fiber material layer 13 remains uncompressed. Due to the flexibility of the proportioning disk 14 it is immaterial whether the hollow space 16 is located on the side of the proportioning disk 14 facing the tank or facing away from the tank, because, in either case, a yielding into the hollow space 16 is possible without substantial compression of the non-woven fiber material layer 13. In this manner, a surface area corresponding to the cross-sectional area of the hollow space 16 is reliably made available for the passage of the gas, the only requirement being that the non-woven fiber material layer 13 or another layer having an equivalent effect is arranged at least in the region of the hollow space 16 and is located on the side of the proportioning disk 14 facing away from the tank 1.

The proportioning disk 14 and the gas-permeable non-woven fiber material layer 13 are preferably situated in or immediately below the plane of the tank ceiling 20.

For example, in a practical application of the invention, the bracing disk 15 may have a diameter of 3 mm and the hollow space 16 may have a diameter of 1.8 mm and a depth of 0.12 mm in order to achieve a flame height of 25 mm (normal flame) at 298° K. ambient temperature, in which case about 1 milligram of fuel is consumed per second. By changing the cross-sectional area of the hollow space, the flame height can be influenced directly.

In accordance with the invention, a quiet and uniform burning of the flame in the normal, vertical position of operation is achieved by an arrangement of the control device which as much as possible reduces or excludes a direct contact of the proportioning disk 14 with the liquid phase of the tank filling. When the lighter is moved from an undefined, for example, horizontal carrying position into a vertical position for ignition, the liquid fuel, with the exception of a residual amount retained by surface forces, flows from the space situated in front of the proportioning disk 14 into the tank 1, so that the proportioning disk 14 is exposed to gaseous fuel and is separated from the liquid level 21 of the fuel.

Since the thickness of the bracing disk 15 is not greater than the hydraulic diameter of the hollow space 16, the volume of the space situated in front of the proportioning disk 14 is small. Since, also due to the low surface tension and viscosity of the liquid phase of the fuel, the flow resistance is low during flow-off, any possibly retained residual amount of the fuel, relative to the cross-sectional area of the proportioning disk available for the passage of gas, is so small that it runs off, evaporates or burns in a short time, for example, about 1 second. If any spontaneous, bubble-forming boiling of the liquid fuel occurs at all on the side of the proportioning disk 14 facing the tank 1, the amount available for the boiling is evaporated after a short time. Therefore, except for a very short start-up time, gas passes through the proportioning disk 14 exclusively from the gaseous phase of the fuel, so that a quietly and uniformly burning flame is obtained.

The effect achieved in accordance with the invention can be improved in a simple manner by various measures.

An improvement of the flow-off of the liquid phase as complete as possible during moving the burner into the vertical position is achieved by making the surface of the bracing disk 15 non-wettable. This can be achieved, for example, by coating it with fluorinated hydrocarbon compounds, for example, polytetrafluoroethylene.

When the bracing disk 15 is fuel-repellent, it is advantageous to have a diameter of the opening 17 of such a small size that capillary forces promote the flow-off of the fuel from the hollow space 16.

If the bracing disk 15 has a wettable surface, the effect in accordance with the invention can be improved by geometrically constructing the opening 17 in such a way that capillary effects are avoided.

Furthermore, the flame can be stabilized after ignition especially quickly when the valve member 2 projects into the liquid-gas tank in such a way that the size of the projection corresponds approximately to the depth of the recess 12, so that the proportioning disk 14 is located approximately in the plane of the liquid-gas tank ceiling 20 of the liquid-gas tank 1.

While, in accordance with the invention, the intended effect is achieved by a proportioning from the gas phase, the known solutions attempt to obtain a wetting of the porous membrane with the liquid phase which is as complete as possible. In these cases, due to the thermodynamic conditions, a boiling with a spontaneous or periodic bubble formation cannot be avoided, even if, in accordance with the proposal of French Pat. No. 2,313,639, the bracing member is constructed so as to be thermally insulating.

Further advantageous embodiments of the invention are explained with the aid of FIGS. 2–8, each illustrating a cross-sectional view of the control device. All reference numerals are selected in accordance with FIG. 1.

Figure 2:
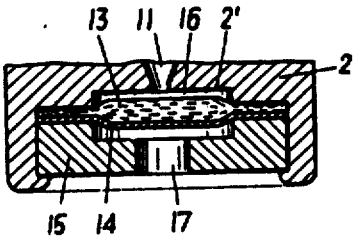
FIGS. 2 through 10 are cross-sectional views through various advantageous embodiments of the control device.

FIG. 2 shows an embodiment wherein the hollow space 16 is formed by a recess at the end face of the recess 12. Accordingly, the hollow space 16 can be manufactured in one step with the production of the recesses 12 in the valve member 2, which can be done with high accuracy.

The illustrated construction of the bracing disk 15 results in a symmetrical deformation of the proportioning disk 15 and of the non-woven fiber material 13.

Figure 3:
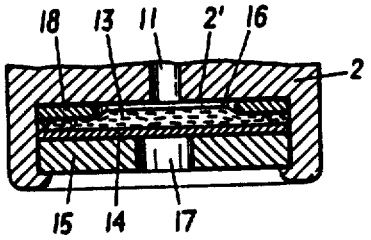

In FIG. 3, as in FIG. 2, the hollow space 16 is arranged on that side of the proportioning disk 14 which faces away from the tank 1, however, is limited at the periphery by a spacer ring 18 which, as is true for the proportioning disk 14 and the non-woven fiber material layer 13, is braced in a gas-tight manner by the bracing disk 15. The spacer ring 18 consists of a plastics material of high stiffness, compressive strength, dimensional stability under heat, and low thermal conductivity. Particularly suitable for this purpose are structural components of polyimide, for example, a type manufactured by Du Pont under the tradename "Kapton®". This material has approximately the same thermal expansion as brass, so that, when the valve member 2 is made of machining brass, no thermal tensions impair the function of the device in accordance with the invention. The spacer ring 18 can be easily stamped from commercially available films, which facilitates a very inexpensive production. Moreover, the plastics material of the spacer ring 18 promotes the sealing action at the bracing surface. The opening 17 is small in relation to the hydraulic diameter, so that the retention of large amounts of liquid fuel is avoided when the lighter is moved into the vertical position.

Figure 4:
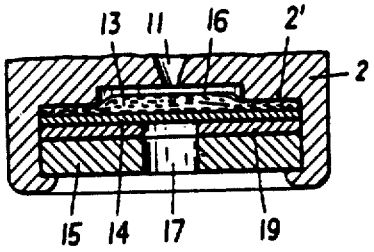

The embodiment in accordance with FIG. 4 corresponds essentially to that of FIG. 2, however, an intermediate ring 19 is arranged between proportioning disk 14 and bracing disk 15. The intermediate ring 19 consists of a plastics material of the type as it is also advantageously used for the spacer ring 18, FIG. 3. As a result, the sealing action of the bracing surface is promoted, on the one hand, and, on the other hand, damage to the proportioning disk 14 during assembly is avoided when, for example, a measuring pipe is attached for checking the amount of gas passing through.

Figure 5:
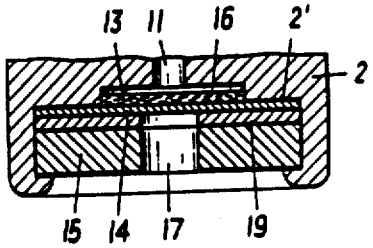

FIG. 5 shows an embodiment in which a non-woven fiber material layer 13 is arranged only in the region of hollow space 16 provided in the valve member 2. For ensuring a good sealing action at the bracing surface, and for avoiding damage to the proportioning disk 14 during assumbly, an intermediate ring 19 is arranged between the bracing disk 15 and proportioning disk 14, as in FIG. 4. The arrangement of the non-woven fiber material layer 13 exclusively in the region of the hollow space 16 does not lead to functional disadvantages, however, makes possible savings in material and permits an especially simple assembly.

Figure 6:
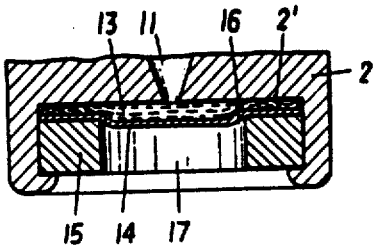

In FIG. 6, an embodiment is illustrated wherein the hollow space 16 is provided in the bracing disk 15 and continues into the opening 17 without projection. The purpose of this construction is to avoid capillary effects in the case of a wettable surface of the bracing disk 15. The opening 17 has a relatively large diameter, which promotes the flow-off of the liquid phase in the case of a wettable surface of the bracing disk 15, because a capillary effect is avoided. Basically, the opening 17 toward the tank 1 can also be constructed so as to widen in a funnel-shaped manner.

Figure 7:
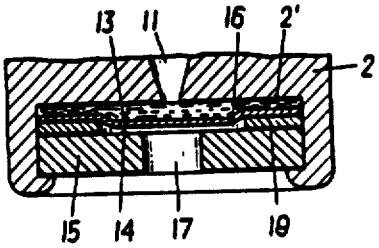

In FIG. 7, as in FIG. 6, the hollow space 16 is also arranged on that side of the proportioning disk 14 which faces the tank 1, however, as in FIG. 3, is formed by a spacer ring 18. The properties of the spacer ring 18 have been explained in the description of FIG. 3. This embodiment facilitates a very economical production.

Figure 8:
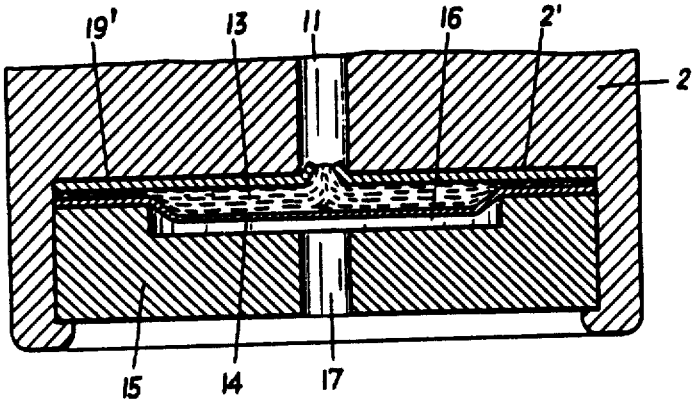

FIG. 8 shows an embodiment which essentially corresponds to that of FIG. 1, however, an intermediate layer 19′ is provided at the side of the non-woven fiber material layer 13 facing the burner tip. The intermediate layer 19′ consists of a plastics material as it is advantageously used for the spacer ring 18 for the embodiment of the invention according to FIG. 3.

The manufacturing costs of the lighter according to the invention are substantially reduced just by the fact that no large structural components are required which would lead to high costs for materials. Also, the costs for the mechanical finishing of the structural components are low because it is not necessary to remove large amounts of material and no work with exacting requirements must be performed at locations which are not easily accessible, for example, in deep blind-end bores.

Since the required small parts are all arranged in very shallow recesses, the mounting of these parts is also free of problems and can be performed withrelatively simple devices.

Moreover, the small dimensions of the structural components prevent the occurrence of great thermal expansions or thermal tensions which, for example, due to long-term storage or transport at high temperatures, irreversibly reduce the necessary bracing forces.

The usually occurring dimensional deviations may lead to substantial differences in the flame height within one production series can be substantially reduced in an economical manner by the device in accordance with the invention. On the one hand, the simplicity of the required structural components facilitates a high constancy in quality. The arrangement of all small parts in easily accessible, shallow recesses also reduced the probability of incorrect assembly. Moreover, it makes possible a check of the gas permeability of the proportioning disk 14 in a simple manner, as well as a conpensation of the observed inconsistencies of the amounts of gas passing through. This can be done, for example, in the following manner.

After inserting the non-woven fiber material layer 13 and the proportioning disk 14 into the recess 12, a measuring pipe is pressed on tightly. The measuring pipe has an exactly defined internal diameter, preferably greater than the hydraulic diameter. The amount of gas flowing through is measured and compared to a fixed reference value. In the case of deviations caused by inconsistencies of the permeability of the proportioning disk 14, either the proportioning disk 14 can be blown out and be replaced by a new one, or the diameter of the hollow space 16 is adjusted accordingly. This can be done, for example, by selecting and mounting a suitable combination of stored components with various diameters of the hollow space, and of bracing disks 15 or spacer rings 18. Such a checking and selecting device can be easily included in a conventional automated manufacturing line.

In the known embodiment, measures for checking and compensating for inconsistencies in the amounts flowing through are significantly more complicated or cannot be carried out at all.

Another advantage of the device in accordance with the invention concerns the change of the originally adjusted flame characteristic due to aging which frequently occurs even without use of the lighter. Using microporous, uniaxially stretched polypropylene film, preferably of "Celgard®2500" as the material for the proportioning disk 14, particularly in combination with a non-woven fiber material layer 13 of non-woven propylene fibers, results in a very high aging stability of the device in accordance with the invention with respect to the constancy of the flame characteristic.

The uniaxially stretched polypropylene film is deformable in the non-stretched direction, so that the amount flowing through could be influenced unintentionally. Therefore, it is advantageous to construct the opening of the valve bore 11 in a very small size, for example, 0.1 to 0.4 mm, so that the proportioning disk and the fiber material layer cannot be pressed in by the gas pressure, and it is also advantageous to limit the depth of the hollow space 16 *between disk 14 and roof 24* if the [latter] *hollow space* is arranged on the side of the proportioning disk facing the burner tip, *as shown in*

Figure 9:
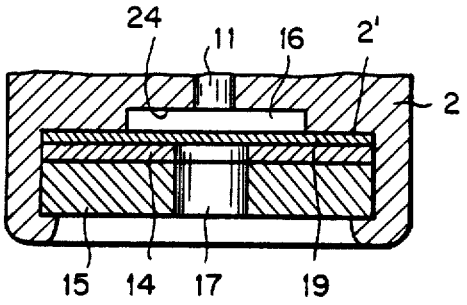

*FIG. 9*, in order to avoid an irreversible deformation of the proportioning disk under the influence of the gas pressure acting on it.

Figure 10:
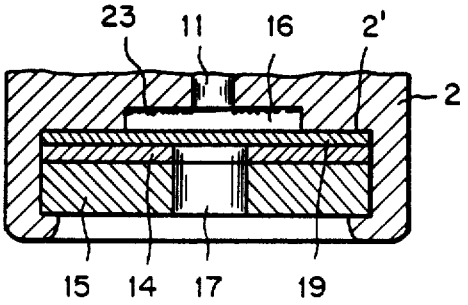

Instead of the non-woven fiber material layer it is also possible to use any other component which has a gas-permeable layer alongside the contact surface with the proportioning disk 14. This can be achieved, for example, also thereby that, as illustrated in FIG. 10, the valve member 2 is roughened *23* on the end face 2' of the blind hole-like recess 12 at least in the region of the hollow space 16 in a suitable manner, for example, by means of sand blasting.

In the production of lighters, such as, non-refillable pocket lighters, the filling amount of the liquid gas must be limited to approximately 80% of the volume of the fuel tank. During the filling procedure, the ambient temperature is about 20° to 25° C. This limitation to 80% is necessary for safety reasons because, during later storage or during the use of the lighters, the liquid fuel may lead to an explosion-like bursting of the tank in the case of substantially higher temperatures, such as 60° C.

The fact that about 20% of the capacity of the tank must be occupied by the gaseous phase of the fuel is utilized in the lighters in accordance with the invention in order to ensure that the proportioning disk and the components serving to brace the proportioning disk do not come into contact with the liquid level of the fuel when the lighter is used in the vertical position.

I claim:

1. Liquid gas-operated lighter, such as pocket lighter, comprising a burner tip, a fuel tank and, arranged therebetween, a valve assembly serving as the only means of communication between said fuel tank and said burner tip, an annular flange formed at an end face of said valve assembly facing said fuel tank, said flange defining a recess, said valve assembly including a valve bore opening to said recess communicating with said valve, a control device for the flame height which device is non-alterable by the user of the lighter, said control device received in said recess and including a fuel-permeable proportioning disk, said proportioning disk tightly braced in its border region toward said end face by means of a bracing member so that gas is enabled to flow only through said proportioning disk, the border region formed between said end face and said bracing member is rendered permanently gas-tight, said bracing member secured in its position by securing means formed on said flange and provided with passage means for the fuel, said proportioning disk on the side facing said burner tip facing a gas-permeable layer, characterized in that said proportioning disk is a microporous film having slot-shaped pores oriented in the direction perpendicular to the surface of said disk, and that said bracing member (15) together with said flange forms the conclusion of the lower end of said control device (12 to 16) and, in the vertical position of use of said lighter, said lower end is always spaced at a distance above the liquid phase of the liquid gas, and that the space between said lower end and the liquid level (21) is free from structural components, so that said lower end of said control device is exposed exclusively to the gaseous phase of the fuel in the vertical position of use of the lighter.

2. Lighter according to claim 1, characterized in that said lower end of said control device projects out of the material forming said fuel tank (1) into the interior of said fuel tank, and that the length of the portion projecting into the interior of said fuel tank essentially corresponds to the depth of said recess (12) in said valve assembly which receives said proportioning disk and said bracing member.

3. Lighter according to claims 1 or 2, characterized in that the surfaces and spaces of said lower end of said control device projecting into said fuel tank (1) have such a size and volume that the amount of the liquid fuel which adheres to said components due to surface forces after said lighter has been moved from an essentially horizontal carrying position when said lighter is moved into the usual, vertical position of use, is smaller than the amount of fuel consumed by the normal flame within three seconds.

4. Lighter according to claim 3, characterized in that the amount of fuel adhering to said components is smaller than the amount of fuel consumed by the normal flame within less than one second.

5. Lighter according to claim 1, characterized in that at least the surface of said bracing member (15) facing said fuel tank (1) is constructed so as to be fuel-repellent.

6. Lighter according to claim 1, characterized in that the thickness of said bracing member (15) is smaller than the diameter of the surface area of said proportioning disk (14) permitting passage of fuel therethrough.

7. Lighter according to claim 6, characterized in that the thickness of said bracing member is smaller than half said diameter of said proportioning.

8. Lighter according to claim 1, characterized in that said bracing member (15) consists of a metal material.

9. Lighter according to claim 8, characterized in that said metal material is machining brass.

10. Lighter according to claim 1, characterized in that a hollow space is defined between an unbraced area of said proportioning disk and said bracing member permitting passage of fuel.

11. Lighter according to claim 1, characterized in that on the side of said proportioning disk (14) facing said burner tip said gas permeable layer comprising a non-woven fiber material layer (13) having approximately the same size is provided.

12. Lighter according to claim 11, characterized in that on the side of said non-woven fiber material layer (13) facing said burner tip an intermediate layer (18,19') of plastics material is provided at least corresponding to said border region of said proportioning disk (14).

13. Lighter according to claim 12, characterized in that said plastics material is polyimide.

14. Lighter according to claim 1, characterized in that said proportioning disk (14) consists of a microporous, uniaxially stretched polypropylene film.

15. Lighter according to claim 14, characterized in that said film is "Celgard ®2500".

16. Liquid gas-operated lighter, such as pocket lighter, comprising a burner tip, a fuel tank and, arranged therebetween, a valve assembly serving as the only means of communication between said fuel tank and said burner tip, an annular flange formed at an end face of said valve assembly facing said fuel tank, said flange defining a recess, said valve assembly including a valve bore opening to said recess and communicating with said valve, a control device for the flame height which device is non-alterable by the user of the lighter, said control device received in said recess and including a fuel-permeable proportioning disk, said proportioning disk tightly braced in its border region toward said end face by means of a bracing member so that gas is enabled to flow only through said proportioning disk, the border region formed between said end face and said bracing member is rendered permanently gas-tight, said bracing member secured in its position by securing means formed on said flange and provided with passage means for the fuel, said proportioning disk on the side facing said burner tip facing a hollow space, the cross-sectional area of said hollow space perpendicularly to the axis of said proportioning disk determining the position and size of the surface of said proportioning disk which permits passage of fuel therethrough, characterized in that said proportioning disk is a microporous film having slot-shaped pores oriented in the direction perpendicular to the surface of said disk, and that said bracing member (15) together with said flange forms the conclusion of the lower end of said control device (12 to 16) and, in the vertical position of use of said lighter, said lower end is always spaced at a distance above the liquid phase of the liquid gas, and that the space between said lower end and the liquid level (21) is free from structural components, so that said lower end of said control device is exposed exclusively to the gaseous phase of the fuel in the vertical position of use of the lighter.

17. Lighter according to claim 16, characterized in that said end face (2') is roughened in order to permit fuel flow from said proportioning disk toward said valve bore.

18. Lighter according to claim 16, characterized in that said end face (2') has a distance from said proportioning disk which limits the yielding of said proportioning disk (14) under the influence of the pressure acting on it.

19. Lighter according to claim 16 or 18, characterized in that in said hollow space (16) is arranged a disk (13) of non-woven fiber material [said] *forming of* gas-permeable layer, the thickness of said disk of non-woven material being smaller than the distance of said end face (2') from said proportioning disk (14).

20. Lighter according to claim 16 characterized in that said proportioning disk (14) consists of a microporous, uniaxially stretched polypropylene film.

21. Lighter according to claim 20 characterized in that said film is "Celgard ®2500".

*22. Liquid gas-operated lighter, such as a pocket lighter, comprising a burner tip, a fuel tank and, arranged therebetween, a valve assembly serving as the only means of communication between said fuel tank and said burner tip, an annular flange formed at an end face of said valve assembly facing said fuel tank, said flange defining a recess, said valve assembly including a valve bore opening to said recess and communicating with said valve, a control device for the flame height which device is non-alterable by the user of the lighter, said control device received in said recess and including a fuel-permeable proportioning disk, said proportioning disk tightly braced in its border region toward said end face by means of a bracing member so that gas is enabled to flow only through said proportioning disk, the border region formed between said end face and said bracing member is rendered permanently gas-tight, said bracing member secured in its position by securing means formed on said flange and provided with passage means for the fuel, said proportioning disk on the side facing said burner tip directly facing a hollow space in the absence of a gas permeable structural component, the cross-sectional area of said hollow space perpendicularly to the axis of said proportioning disk determining the position and size of the surface of said proportioning disk which permits passage of fuel therethrough, characterized in that said proportioning disk is a flexible microporous film having slot-shaped pores oriented in the direction perpendicular to the surface of said disk, said slot-shaped pores directing said gas into said hollow space which space comprises means for passage of said gas into said valve bore, and that said bracing member together with said flange forms the conclusion of the lower end of said control device and, in the vertical position of use of said lighter, said lower end is always spaced at a distance above the liquid phase of the liquid gas, and that the space between said lower end and the liquid level is free from structural components, so that said lower end of said control device is exposed exclusively to the gaseous phase of the fuel in the vertical position of use of the lighter.*

*23. The lighter of claim 22 wherein the microporous film is a uniaxially stretched polypropylene film having a thickness of between 15 and 39 microns.*

*24. The lighter of claim 23 wherein the microporous film is "Celgard ® 2500".*

*25. The lighter of claim 22 wherein said gas passage means is provided by a roughened end face in the region of said hollow space.*

*26. The lighter of claim 22 wherein said gas passage means is provided by a separate non-woven fiber material layer which is located only in said hollow space.*

*27. The lighter of claim 22 wherein the hollow space is defined by a cross-sectional area of a depth which is minimized in order to prevent irreversible deformation of said microporous film.*

*28. The lighter of claim 22 wherein the thickness of the bracing member is not greater than the hydraulic diameter of the hollow space.*

*29. The lighter of claim 22 wherein the thickness of said bracing member is smaller than half the diameter of said proportioning.*

*30. The lighter of claim 22 wherein about 20% of the capacity of the fuel tank is occupied by the gaseous phase of the fuel and that the components serving to brace the proportioning disk do not come in contact with the liquid level of the fuel.*

*31. The lighter of claim 22 wherein said bracing member and said end face (2') are each made of metal having substantially flat opposed surfaces which are forced toward each other by said securing means to tightly brace the border region of said proportioning disk in a gas-tight manner.*

*32. The lighter of claim 22 wherein the surfaces and spaces of said lower end of said control device projecting into said fuel tank have such a size and volume that the amount of the liquid fuel which adheres to said components due to surface forces after said lighter has been moved from an essentially horizontal carrying position when said lighter is moved into the usual, vertical position of use, is smaller than the amount of fuel consumed by the normal flame within three seconds.*

*33. The lighter of claim 32, wherein the amount of fuel adhering to said components is smaller than the amount of fuel consumed by the normal flame within less than one second.*

*34. Liquid gas-operated lighter, such as a pocket lighter, comprising a burner tip, a fuel tank and, arranged therebetween, a valve assembly serving as the only means of communication between said fuel tank and said burner tip, an annular flange formed at an end face of said valve assembly facing said fuel tank, said flange defining a recess, said valve assembly including a valve bore opening to said recess and communicating with said valve, a control device for the flame height which device is non-alterable by the user of the lighter, said control device received in said recess and*

*including a fuel-permeable proportioning disk, said proportioning disk tightly braced in its border region toward said end face by means of a bracing member so that gas is enabled to flow only through said proportioning disk, the border region formed between said end face and said bracing member is rendered permanently gas-tight, said bracing member secured in its position by securing means formed on said flange and provided with passage means for the fuel, said proportioning disk on the side facing said burner tip directly facing a hollow space, the cross-sectional area of said hollow space perpendicularly to the axis of said proportioning disk determining the position and size of the surface of said proportioning disk which permits passage of fuel therethrough, characterized in that said proportioning disk is a flexible microporous film having slot-shaped pores oriented in the direction perpendicular to the surface of said disk, said slot-shaped pores directing said gas into said hollow space, which space is constructed to allow passage of said gas into said valve bore from areas surrounding said valve bore when the film is deformed, and that said bracing member together with said flange forms the conclusion of the lower end of said control device and, in the vertical position of use of said lighter, said lower end is always spaced at a distance above the liquid phase of the liquid gas, and that the space between said lower end and the liquid level is free from structural components, so that said lower end of said control device is exposed exclusively to the gaseous phase of the fuel in the vertical position of use of the lighter.*

*35. The lighter of claim 34 wherein the microporous film is a uniaxially stretched polypropylene film having a thickness of between 15 and 39 microns.*

*36. The lighter of claim 35 wherein the microporous film is "Celgard® 2500".*

*37. The lighter of claim 34 wherein the hollow space is defined by a cross-sectional area of a depth which is minimized in order to prevent irreversible deformation of said microporous film.*

*38. The lighter of claim 34 wherein the areas surrounding said valve bore are provided with means for passage of said gas from said deformed film to said valve bore.*

*39. Liquid gas-operated lighter, such as a pocket lighter, comprising a burner tip, a tank for fuel in the liquid and gaseous states and, arranged therebetween, a valve assembly serving as the only means of communication between said fuel tank and said burner tip, an annular flange formed at an end face of said valve assembly facing said fuel tank, said flange defining a recess, said valve assembly including a valve bore opening to said recess and communicating with said valve, a control device for the flame height which device is non-alterable by the user of the lighter, said control device received in said recess and including a fuel-permeable proportioning disk, said disk tightly braced in its border region against the periphery of said end face by means of a bracing member so that fuel is enabled to flow only through said disk, the border region formed between said end face and said bracing member being rendered permanently non-permeable for fuel, said bracing member secured in its position by means formed on said flange and provided with passage means for the fuel, said disk on the side facing said burner tip directly facing a hollow space, the cross-sectional area of said hollow space perpendicularly to the axis of said disk determining the position and size of the surface of said disk which permits passage of fuel therethrough, characterized in that said disk is a flexible microporous film having substantially discrete pores for providing fuel passage in the direction perpendicular to the surface of said disk, said pores being of slot-shaped cross-section and directing said fuel into said hollow space, which space is constructed to allow passage of said fuel into said valve bore even from areas within said hollow space where fuel after passing through said disk would otherwise remain trapped due to said film deforming and contacting opposite portions inside said braced periphery of said end face, and that said bracing member together with said flange forms the conclusion of the lower end of said control device and, in the vertical position of use of said lighter, said lower end is always spaced at a distance above the liquid phase of the fuel, and that the space between said lower end and the liquid level is free from structural components, so that said lower end of said control device is exposed exclusively to the gaseous phase of the fuel in the vertical position of use of the lighter.*

*40. The lighter of claim 39 wherein the microporous film is a uniaxially stretched polypropylene film having a thickness of between 15 and 39 microns.*

*41. The lighter of claim 40 wherein the microporous film is "Celgard® 2500".*

*42. The lighter of claim 39 wherein, with the exception of said microporous film, all components of the lower end of said control device are made of metal, said components holding said disk tightly braced in its border region in order to enable gas to flow only through said disk from said fuel tank to said burner tip, said lower end of said control device projecting into said fuel tank and that the amount of liquid fuel which adheres to said components when said lighter is moved into a vertical operational position is less than two cubic millimeters and the amount of fuel passing through said disk during operation of the lighter produces a flame height of about 25 mm.*

* * * * *